United States Patent
Drego et al.

(10) Patent No.: US 11,061,678 B1
(45) Date of Patent: Jul. 13, 2021

(54) SYSTEMS AND METHODS FOR OPTIMIZING NESTED LOOP INSTRUCTIONS IN PIPELINE PROCESSING STAGES WITHIN A MACHINE PERCEPTION AND DENSE ALGORITHM INTEGRATED CIRCUIT

(71) Applicant: quadric.io Inc., Burlingame, CA (US)

(72) Inventors: Nigel Drego, Burlingame, CA (US); Mrinalini Ravichandran, Burlingame, CA (US); Jianman Chang, Burlingame, CA (US); Daniel Firu, Burlingame, CA (US); Veerbhan Kheterpal, Burlingame, CA (US)

(73) Assignee: qaudric.io Inc, Burlingame, CA (US)

( * ) Notice: Subject to any disclaimer, the term of this patent is extended or adjusted under 35 U.S.C. 154(b) by 0 days.

(21) Appl. No.: 17/127,213

(22) Filed: Dec. 18, 2020

Related U.S. Application Data (60) Provisional application No. 62/957,688, filed on Jan. 6, 2020, provisional application No. 63/050,971, filed on Jul. 13, 2020.

(51) Int. Cl.
*G06F 9/44* (2018.01)
*G06F 8/40* (2018.01)
(Continued)

(52) U.S. Cl.
CPC .............. *G06F 9/325* (2013.01); *G06F 8/443* (2013.01); *G06F 9/3804* (2013.01);
(Continued)

(58) Field of Classification Search
CPC ...... G06F 9/325; G06F 9/3804; G06F 9/3808; G06F 9/3836; G06F 9/30065;
(Continued)

(56) References Cited

U.S. PATENT DOCUMENTS

| | | | |
|---|---|---|---|
| 2009/0055815 A1* | 2/2009 | Chan .................. | G06F 8/443 717/160 |
| 2009/0119486 A1* | 5/2009 | Dieffenderfer ...... | G06F 9/30054 712/205 |

(Continued)

OTHER PUBLICATIONS

International Application No. PCT/US2020/066162, International Search Report and Written Opinion dated Apr. 28, 2021, 16 pages.

*Primary Examiner* — Daniel H Pan
(74) *Attorney, Agent, or Firm* — Padowithz Alce; Alce PLLC (57) ABSTRACT

In one embodiment, a method for improving a performance of an integrated circuit includes implementing one or more computing devices executing a compiler program that: (i) evaluates a target instruction set intended for execution by an integrated circuit; (ii) identifies one or more nested loop instructions within the target instruction set based on the evaluation; (iii) evaluates whether a most inner loop body within the one or more nested loop instructions comprises a candidate inner loop body that requires a loop optimization that mitigates an operational penalty to the integrated circuit based on one or more executional properties of the most inner loop instruction; and (iv) implements the loop optimization that modifies the target instruction set to include loop optimization instructions to control, at runtime, an execution and a termination of the most inner loop body thereby mitigating the operational penalty to the integrated circuit.

16 Claims, 5 Drawing Sheets

(51) Int. Cl.
  *G06F 9/32*    (2018.01)
  *G06F 9/38*    (2018.01)
  *G06F 8/41*    (2018.01)
  *G06F 9/30*    (2018.01)

(52) U.S. Cl.
  CPC .......... *G06F 9/3808* (2013.01); *G06F 9/3836* (2013.01); *G06F 8/452* (2013.01); *G06F 9/30065* (2013.01)

(58) Field of Classification Search
  CPC .. G06F 9/381; G06F 9/45516; G06F 9/45525; G06F 8/443; G06F 8/452
  USPC ......... 712/241, 227; 717/150, 151, 159, 160
  See application file for complete search history.

(56) References Cited

U.S. PATENT DOCUMENTS

| | | | |
|---|---|---|---|
| 2009/0261995 A1 | 10/2009 | Sakaguchi | |
| 2012/0167068 A1* | 6/2012 | Lin | G06F 8/4434 717/160 |
| 2019/0042224 A1* | 2/2019 | Caballero de Gea | G06F 8/4441 |
| 2019/0377580 A1 | 12/2019 | Vorbach et al. | |

* cited by examiner

FIGURE 1

IDENTIFYING A CANDIDATE NESTED LOOP S210

IMPLEMENTING A LOOP OPTIMIZATION S220
- DEFINING IMPLICIT BRANCH INSTRUCTIONS S222
- SETTING A SIDEBAND LOOPBACK BIT S224

EXECUTING IMPLICIT BRANCH INSTRUCTIONS S230
- COPYING AND STORING SETUP INSTRUCTIONS S232
- IMPLEMENTING AND TRACKING A LOOP COUNTER S234

EXECUTING THE SIDEBAND LOOPBACK BIT S240

SYSTEMS AND METHODS FOR OPTIMIZING NESTED LOOP INSTRUCTIONS IN PIPELINE PROCESSING STAGES WITHIN A MACHINE PERCEPTION AND DENSE ALGORITHM INTEGRATED CIRCUIT

CROSS-REFERENCE TO RELATED APPLICATIONS

This application claims the benefit of U.S. Provisional Application No. 62/957,688, filed 6 Jan. 2020, and of the U.S. Provisional Application No. 63/050,971, filed 13 Jul. 2020, which are incorporated herein in their entireties by this reference.

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and generally, machine learning appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But, modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit and processing techniques that are capable of high performance and real-time processing and computing of routine and advanced sensor signals for enabling perception of robotics or any type or kind of perceptual machine.

The inventors of the inventions described in the present application have designed an integrated circuit architecture and one or more processing techniques that allow for enhanced sensor data processing capabilities and have further discovered related methods for implementing the integrated circuit architecture for several purposes including for enabling perception of robotics and various machines.

SUMMARY OF THE INVENTION(S)

In one embodiment, a method for improving a performance of an integrated circuit includes implementing one or more computing devices executing a compiler program that: (i) evaluates a target instruction set intended for execution by an integrated circuit; (ii) identifies one or more nested loop bodies within the target instruction set based on the evaluation; (iii) evaluates whether a most inner loop body within the one or more nested loop bodies comprises a candidate inner loop body that requires a loop optimization that mitigates an operational penalty to the integrated circuit based on one or more executional properties of the most inner loop body; and (iv) implements the loop optimization that modifies the target instruction set to include loop optimization instructions to control, at runtime, an execution and a termination of the most inner loop body thereby mitigating the operational penalty to the integrated circuit.

In one embodiment, each iteration of the most inner loop body is executed by an array processing core of an integrated circuit array of the integrated circuit that includes a plurality of array processing cores; and the loop optimization causes a distinct processing circuit external to the integrated circuit array to (a) control a start of the execution of each iteration by the array processing core and (b) control a termination of an execution of the most inner loop body by the array processing core.

In one embodiment, if the most inner loop body within the loop body of the nested loop bodies is associated with an instruction for backwards branching, automatically setting the most inner loop body as the candidate inner loop for the loop optimization.

In one embodiment, the evaluation further includes: (i) identifying a code size of the candidate inner loop, (ii) identifying whether the code size of the candidate inner loop satisfies or does not exceed an instruction size threshold, wherein the instruction size threshold relates to a maximum possible code size of a potential candidate for loop optimization, and wherein automatically setting the most inner loop body as the candidate inner loop for the loop optimization when the code size of the candidate inner loop satisfies or does not exceed the instruction size threshold.

In one embodiment, the evaluation further includes: (i) inspecting a structure of the candidate inner loop; (ii) identifying whether loop bounds of the candidate inner loop is discoverable based on the inspection; and (iii) if the loop bounds of the candidate inner loop are discoverable, deriving a starting condition and a deriving terminating condition of the candidate inner loop, wherein a combination of the starting condition and the terminating condition define the loop bounds of the candidate inner loop.

In one embodiment, the loop optimization instructions comprise an implicit branch instruction that controls a looping operation of the candidate inner loop.

In one embodiment, the implicit branch instruction comprises a multi-part branch instruction that is instructionally tethered to a loop body of the candidate inner loop for controlling a looping back operation of the candidate inner loop without a need for executing explicit backward branching instructions within the loop body of the candidate inner loop.

In one embodiment, the implicit branch instruction comprises a multi-position branch instruction having (a) a first part comprising a first instruction that is positioned ahead of the loop body of the candidate inner loop and (b) a second part comprising one or more bits of instruction that are positioned within the loop body of the candidate inner loop.

In one embodiment, a first part of the multi-part branch instruction comprises an antecedent instruction that is codified at a position ahead of the loop body of the candidate inner loop.

In one embodiment, the antecedent instruction comprises loop bounds of the candidate inner loop, wherein the loop bounds include a starting condition and a terminating condition of the candidate inner loop.

In one embodiment, the antecedent instructions includes a code location target that identifies a starting instruction of the loop body of the candidate inner loop.

In one embodiment, a second part of the multi-part branch instruction comprises a suffixation bit that includes a single bit of instruction appended to a terminal instruction of the loop body of the candidate inner loop or that is arranged in a position within the loop body of the candidate inner loop.

In one embodiment, the single bit of instruction identifies a terminal instruction of the loop body of the candidate inner loop that, when executed, causes a reversion to a code location target of the antecedent instructions that identifies a starting instruction of the loop body of the candidate inner loop.

In one embodiment, an execution of the single bit of instruction causes an increment or a decrement to a dedicated loop counter for the candidate inner loop.

In one embodiment, executing, at runtime, the antecedent instructions includes storing the loop bounds in a memory distinct from a memory storing the loop body of the candidate inner loop, clearing and initializing a dedicated loop counter for the candidate inner loop.

In one embodiment, a system for improving a performance of an integrated circuit includes one or more computing devices executing a compiler program that: (i) evaluates a target instruction set intended for execution by an integrated circuit; (ii) identifies one or more nested loop instructions within the target instruction set based on the evaluation; (iii) evaluates whether a most inner loop body within the one or more nested loop instructions comprises a candidate inner loop body that requires a loop optimization that mitigates an operational penalty to the integrated circuit based on one or more executional properties of the most inner loop instruction; and (iv) implements the loop optimization that modifies the target instruction set to include loop optimization instructions to control, at runtime, an execution and a termination of the most inner loop body thereby mitigating the operational penalty to the integrated circuit.

In one embodiment, the loop optimization instructions comprise a multi-part implicit branch instruction that is instructionally tethered to a loop body of the candidate inner loop for controlling a looping back operation of the candidate inner loop; the multi-part implicit branch including: (a) a first part that is codified at a position ahead of the loop body of the candidate inner loop and that causes a storing of loop bounds of the candidate inner loop, and (b) a second part that includes a single bit of instruction arranged within the loop body of the candidate inner loop that identifies a terminal instruction of the loop body of the candidate inner loop and that, when executed, causes a reversion to a storage location of the loop bounds and/or a code location target of the antecedent instructions that identifies a starting instruction of the loop body of the candidate inner loop.

In one embodiment, a method for improving an operational performance of an integrated circuit includes controlling an execution of a looping operation of a target nested loop within a subject set of instructions, wherein the controlling includes: (i) executing, by a distinct processing circuit, a first part of an implicit branch instruction for the target nested loop, wherein the executing the first part includes: (i-a) storing loop bounds of the target nested loop in a memory distinct from a memory storing the loop body of the target nested loop, (i-b) clearing and initializing a dedicated loop counter for the target nested loop, (i-c) storing a code location target of a starting instruction of the loop body of the candidate inner loop, wherein the dedicated loop counter for the target nested loop is incremented or decremented according to each executed iteration of the target nested loop; (ii) executing, by the distinct processing circuit, a second part of the implicit branch instruction, wherein the second part includes a single bit instruction arranged within the loop body of the candidate inner loop, wherein the executing the second part includes: (ii-a) causes a reversion to a storage location of the loop bounds, and (ii-b) an increment or a decrement of the dedicated loop counter for the target nested loop; wherein controlling the execution includes: continuing the execution or terminating the execution of the loop body of the target nest loop by an array processing circuit of an integrated circuit array based on whether a value of the dedicated loop counter satisfies a terminating condition defined in the loop bounds.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

I. Overview

In an integrated circuit configured with pipeline processing stages, a backwards branching instruction may cause stalls in the execution of one or more instruction sets thereby increasing a number clock cycles required for processing the instruction set and reducing a performance of the integrated circuit. Backwards branching instructions may typically be found in loop instructions and the like in which an execution of a new iteration of the loop may require that the integrated circuit jump from a terminal instruction of a loop body of the loop back to a branch for executing a new iteration of the loop instructions. Additionally, for certain instruction types such as tight nested loops, stalls may be extremely expensive when the nest loop is really small (e.g., a small number of instructions below a code size threshold or the like). To avoid the stalls, in some integrated circuits, branch predictors may be implemented that make predictions on whether a branch will or will not be taken or executed. In pipeline processing stages, a branch predictor may reduce stalls, however, branch predictors are often complex and expensive, in terms of computational resources (e.g., power, chip area, etc.), to deploy.

One alternative for reducing a stall penalty resulting from backwards branching includes unrolling the code or instruction set, which may reduce a stall penalty by half while simultaneously enlarging the code size. However, in many embedded systems, available memory for storing instructions or code is limited and thus, unrolling the code set may reduce a stall penalty to improve a performance of an integrated circuit, but unrolling also grows the size of the code by double with each unrolling. In such cases, an embedded system may not have sufficient memory to store the increased code size and/or have sufficient available memory to properly executed large code, at runtime.

One or more embodiments of the present application, however, provide systems and techniques for optimizing instruction sets that include backwards branching instructions that may typically produce a stall in execution. In one preferred embodiment of the present application, an instruction set may be optimized to include an implicit branching instruction that abstracts the processing task from a processing circuit executing a nested loop or the like and allows a distinct processing entity (e.g., an IMD (instruction memory dispatcher)) other than an array core of the integrated circuit array to handle the start of iterations of the nested loop and the termination of the nested loop by implementing a setup instruction with a branch target having starting and terminating conditions together with a loopback bit or a reserved bit reverts the distinct processing entity to the branch target for either restarting the loop or terminating the loop, as described in more detail below.

It shall also be recognized that the one or more embodiments of the present application may be implemented in any suitable processing environment including, but not limited to, within one or more IMDs and/or any suitable processing circuit.

The mesh architecture defined by the plurality of processing elements in the array core preferably enable in-memory computing and data movement, as described in U.S. Pat. No. 10,365,860, U.S. patent application Ser. No. 16/292,537, U.S. Provisional Application Nos. 62/649,551 and 62/649,551, which are all incorporated herein in their entireties by this reference and further, enable a core-level predication.

II. A System Architecture of a Dense Algorithm and/or Perception Processing Circuit (Unit)

Figure 1:
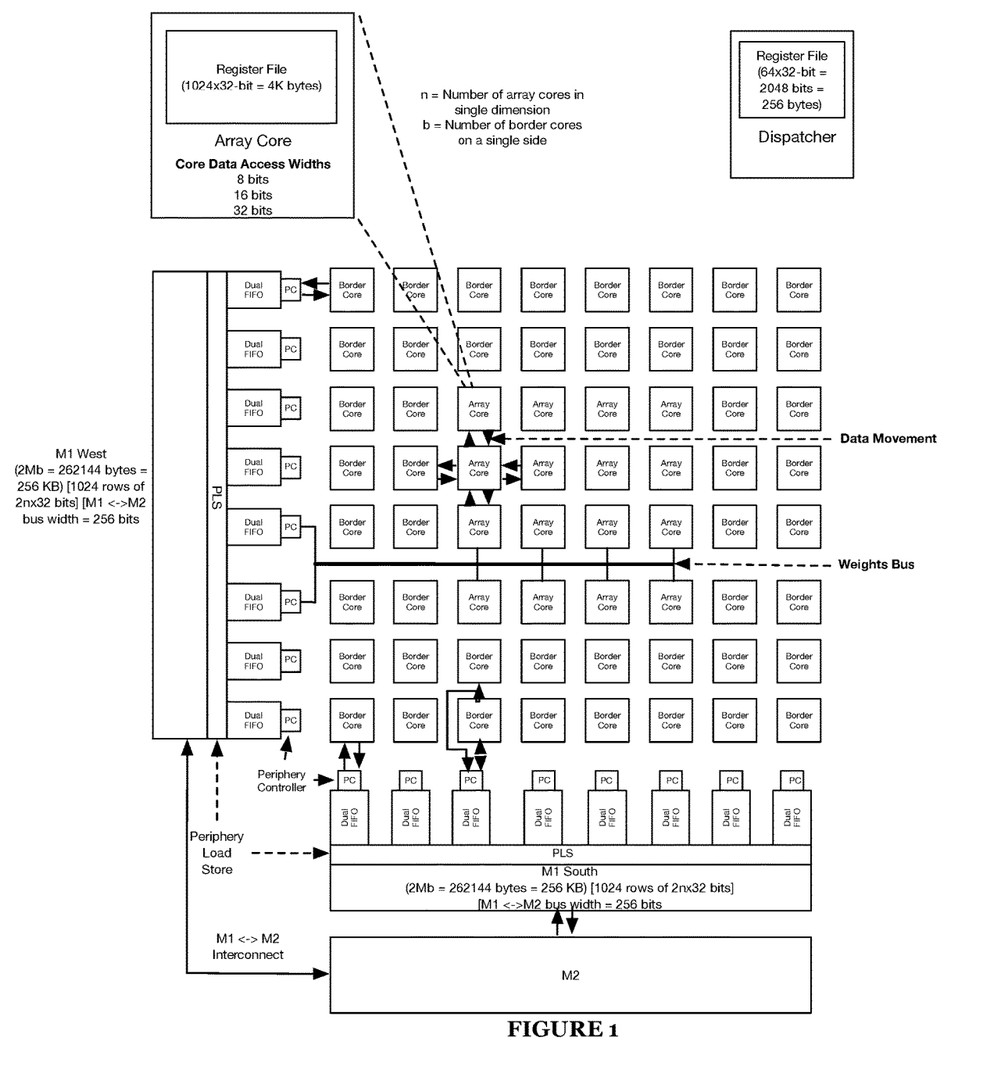
FIG. 1 illustrates a schematic of a system 100 in accordance with one or more embodiments of the present application.

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159, as described in U.S. Pat. Nos. 10,365,860, 10,691,464, and U.S. patent application Ser. No. 16/292,537, which are all incorporated herein in their entireties by this reference.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file 112 having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file 112 of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file 112 of an array core 110 may be any suitable memory element or device, but preferably comprises one or more static random-access memories (SRAMs). The register file 112 may include a large number of registers, such as 1024 registers, that enables the storage of a sufficiently large data set for processing by the array core 110. Accordingly, a technical benefit achieved by an arrangement of the large register file 112 within each array core 110 is that the large register file 112 reduces a need by an array core 110 to fetch and load data into its register file 112 for processing. As a result, a number of clock cycles required by the array core 112 to push data into and pull data out of memory is significantly reduced or eliminated altogether. That is, the large register file 112 increases the efficiencies of computations performed by an array core 110 because most, if not all, of the data that the array core 110 is scheduled to process is located immediately next to the processing circuitry (e.g., one or more MACs, ALU, etc.) of the array core 110. For instance, when implementing image processing by the integrated circuit 100 or related system using a neural network algorithm(s) or application(s) (e.g., convolutional neural network algorithms or the like), the large register file 112 of an array core may function to enable a storage of all the image data required for processing an entire image. Accordingly, most or if not, all layer data of a neural network implementation (or similar compute-intensive application) may be stored locally in the large register file 112 of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file 112 and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file 112, the (raw) input data within the register file 112 may be automatically incremented from the register file 112 and data from neighboring core(s) (e.g., array cores and/or border cores) are continuously sourced to the register file 112 to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border 120 may make a specific request for data from any of the memory elements within the memory hierarchy of the integrated circuit 100.

An array core 110 may, additionally or alternatively, include a plurality of multiplier (multiply) accumulators (MACs) 114 or any suitable logic devices or digital circuits that may be capable of performing multiply and summation functions. In a preferred embodiment, each array core 110 includes four (4) MACs and each MAC 114 may be arranged at or near a specific side of a rectangular shaped array core 110. While, in a preferred embodiment each of the plurality of MACs 114 of an array core 110 may be arranged near or at the respective sides of the array core 110, it shall be known that the plurality of MACs 114 may be arranged within (or possibly augmented to a periphery of an array core) the array core 110 in any suitable arrangement, pattern, position, and the like including at the respective corners of an array core 110. In a preferred embodiment, the arrangement of the plurality of MACs 114 along the sides of an array core 110 enables efficient inflow or capture of input data received from one or more of the direct neighboring cores (i.e., an adjacent neighboring core) and the computation thereof by the array core 110 of the integrated circuit 100.

Accordingly, each of the plurality of MACs 114 positioned within an array core 110 may function to have direct communication capabilities with neighboring cores (e.g., array cores, border cores, etc.) within the integrated circuit boo. The plurality of MACs 114 may additionally function to execute computations using data (e.g., operands) sourced from the large register file 112 of an array core 110. However, the plurality of MACs 114 preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores no. Accordingly, in some embodiments, multiple array cores 110 may be fed weights and/or coefficients data input via the weights bus 116 in parallel to thereby improve the speed of computation of the array cores 110.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that is positioned next to one of the four sides or each of the faces of the array core 110. The ability of an array core no to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file 122. The register file 122 may be configured similar to the register file 112 of an array core 110 in that the register file 122 may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores 110.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it is detected that no input sensor data or the like is received with a predetermined input data flow to the integrated circuit array 105. Additionally, or alternatively, in one variation, the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core 110 in performing computations on an input dataset.

In a preferred implementation of the integrated circuit 100, the progression of data into the plurality of array cores 110 and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores no without requiring an explicit request for the input data from the border cores 120 and/or array cores no. That is, the predetermined data flow schedule enables an automatic flow of raw data from memory elements (e.g., main memory 160) of the integrated circuit 100 to the plurality of border cores 120 and the plurality of array cores no having capacity to accept data for processing. For instance, in the case that an array core 110 functions to process a first subset of data of a data load stored in its register file 112, once the results of the processing of the first subset of data is completed and sent out from the array core 110, the predetermined data flow schedule may function to enable an automatic flow of raw data into the array core 110 that adds to the data load at the register file 112 and replaces the first subset of data that was previously processed by the array core 110. Accordingly, in such instance, no explicit request for additional raw data for processing is required from the array core 110. Rather, the integrated circuit 100 implementing the dispatcher 130 may function to recognize that once the array core 110 has processed some amount of data sourced from its register file 112 (or elsewhere) that the array core 110 may have additional capacity to accept additional data for processing.

In a preferred embodiment, the integrated circuit 100 may be in operable communication with an instructions generator 170 that functions to generate computation, execution, and data movement instructions, as shown by way of example in FIG. 3A. The instructions generator 170 may be arranged off-chip relative to the components and circuitry of the integrated 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general purpose computer processing (GPCP) units 171 that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

In some embodiments, the processing circuitry of the dispatcher 130 includes disparate circuitry including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores no. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it is illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA data transfers may be triggered by a status or operation of one or more of the plurality of array cores 110. For instance, if an array core is completing or has completed a processing of first set of data, the completion or near-completion may trigger the DMA transfers to enable additional data to enter the integrated circuit array 105 for processing.

III. Method for Optimizing Loop Instructions in a Pipelined Processing Stage As shown by way of example in FIG. 2, a method 200 for optimizing nested loop instructions includes identifying a candidate inner loop S210, implementing a loop optimization S220, executing a multi-part implicit branch instruction S230, and executing a reserved bit S240.

Figure 2:
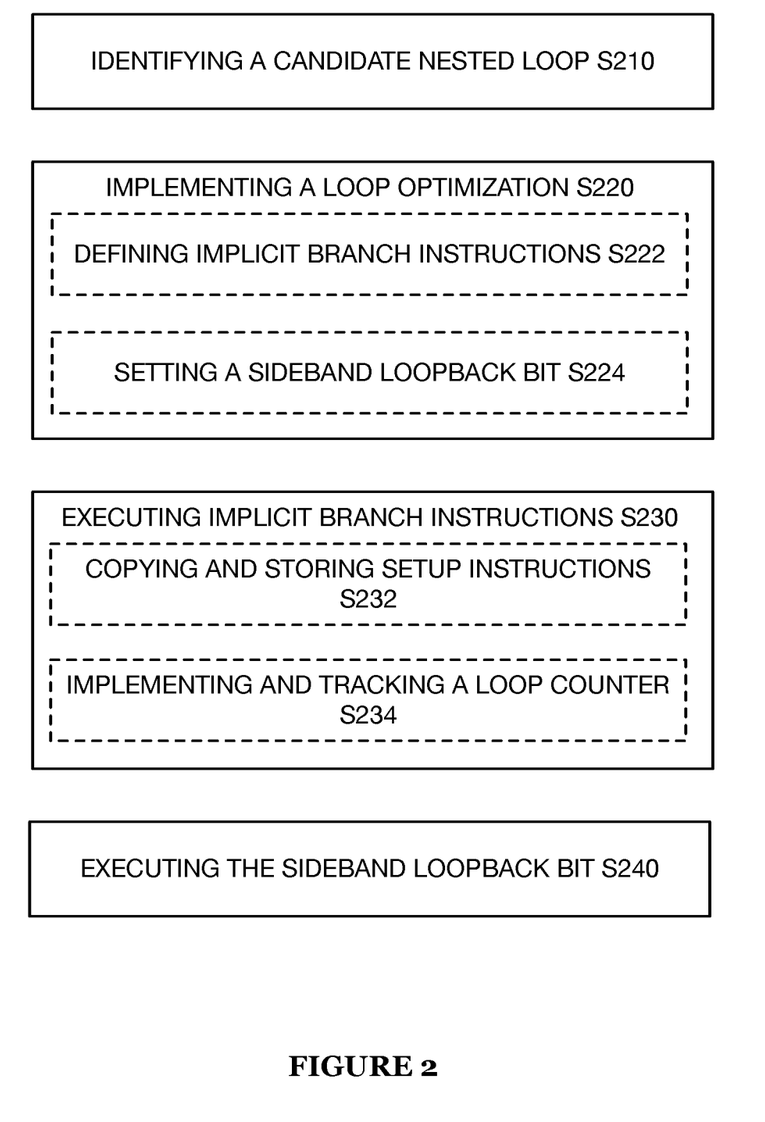
FIG. 2 illustrates a method 200 for implementing a predicate stack in accordance with one or more embodiments of the present application.

The method 200 preferably functions to optimize loop instructions sets by implementing one or more techniques that simultaneously improves performance of an integrated circuit executing inner loop instructions while minimizing a code size of the inner loop instructions.

2.10 Candidate Loop Identification

S210, which includes identifying a candidate loop based on an evaluation of one or more target segments of nested loop instructions of an instruction set with a reduced performance, may function to evaluate a target instruction set to identify one or more instruction segments having attributes that, during execution, reduce an operational performance of an integrated circuit. In a preferred embodiment, S210 may function to perform the evaluation of a target instruction set at compile time. That is, S210 may function to implement a compiler program, code optimization program, and/or the like that may function to perform a static evaluation of the target instruction set for target code segments with a reduced performance.

S210 may preferably function to evaluate one or more segments of the target instruction set that include nested loops. In one or more embodiments, S210 may function to implement the compiler to find or identify the most nested or most inner loop for each or any set of loop instructions of the target instruction set. That is, S210 may function to identify a most inner loop within a loop body as a target for evaluation. Accordingly, the most inner loop of a given loop body preferably relates to a (nest) loop instruction having the deepest depth. In some embodiments, in which a counter may be implemented for enumerating a depth of given loop instruction whereby the most outer loop may be zero or one and for each depth within the most outer loop, the counter increments whereby the largest number of the counter corresponds to the most inner nested loop of a given loop body (i.e., the most outer loop; counter=0 or 1). It shall be noted that a decrementing counter may additionally or alternatively be implemented in which the most outer loop corresponds to the highest count of a given counter and the most inner loop of a loop body of the most outer loop corresponds to a lowest count value (e.g., count=0 or 1).

In one or more embodiments, if an identified most inner loop of a loop body includes one or more instructions within a body of the most inner loop for backwards branching, S210 may function to identify or automatically select the most inner loop as a candidate or a target for loop optimization. The loop optimization, as described in more detail below, preferably reduces a penalty or a stall in an operational performance of an integrated circuit due to an increased number of clock cycles required for executing instructions for backwards branching or the like.

Additionally, or alternatively, S210 may function to evaluate in or more attributes of a target inner loop including, at least, a structure of the target inner loop to identify whether an instruction size or code size of the target inner loop is at or below a instructions size threshold. In one or more embodiments, the instructions size threshold preferably relates to a maximum code size that a target inner loop may have for loop optimization. While it may be preferred that a code size of a target inner loop does not exceed the instruction size threshold, it shall be noted that loop optimization may be performed on any target inner loop having any code size. It has been discovered that the technical benefit of the loop optimization described herein may have greater efficacy in target inner loops having a tight or a small code size (e.g., 1-3 lines of code or the like) relative to target inner loops have a code size that is not tight or small (e.g., a code size exceeding the instruction size threshold).

Additionally, or alternatively, S210 may function to identify a target inner loop as a suitable candidate for loop optimization if the bounds of the loop are known or may be discoverable with ease (i.e., within a reasonable amount of computing time below a discoverability threshold (e.g., a maximum time or period for discovery)). In such embodiments, the bounds of the loop (also referred herein as "loop bounds") preferably relate to a combination of a starting condition and an ending condition for a given (inner) loop. Accordingly, in one or more embodiments, S210 may function to determine, identify, or confirm that loop bounds for a target inner loop are known when a starting condition and a termination condition for the target inner loop are known (i.e., starting condition and/or terminating condition for the loop are stated within the loop body) or readily discoverable (e.g., via inspection of an inspection of a structure of the code of the inner loop, the start or the termination instruction may be derived). In one example in which may include a loop variable, S210 may function to consider or determine that the loop bounds are known if a start or a termination condition of a target inner loop may be derived using mathematics below a complexity threshold (e.g., simple arithmetic: addition, subtraction, or the like).

2.20 Candidate Loop Optimization|Implicit Branch Instruction

Figure 3:
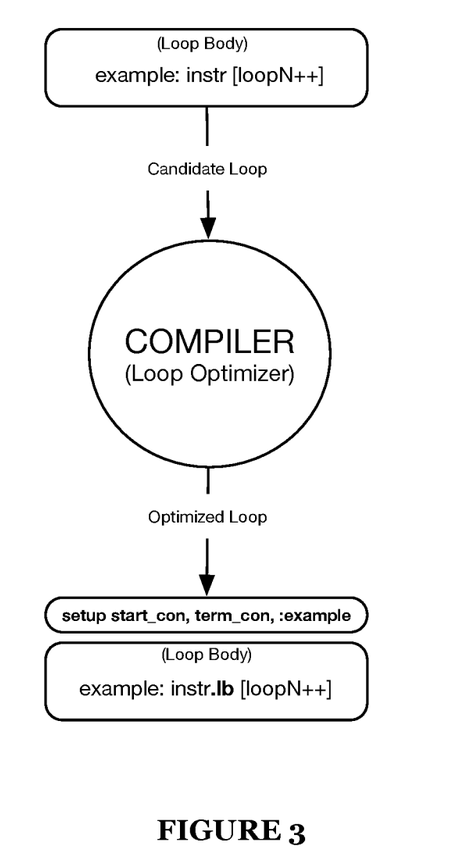
FIG. 3 illustrates a schematic that examples loop optimization at compile time in accordance with one or more embodiments of the present application.

S220, which includes implementing candidate loop optimization, may function to optimize a candidate inner loop of an instruction set by modifying the instruction set to include an implicit branch instruction for at least controlling a looping operation of the candidate inner loop, as shown by way of example in FIG. 3. In a preferred embodiment, an implicit branch instruction as referred to herein preferably relates to a multi-part branch instruction that is instructionally tethered to a loop body of an inner loop for controlling a looping back operation of the inner loop without the need for explicit backward branching instructions within the loop body of the inner loop. In one or more embodiments, controlling the looping operations of the inner loop may include starting and/or restarting an execution of a loop body of the inner loop for up to N−1 times and terminating an execution of the loop body upon a satisfaction of a predetermined condition or a dynamic condition.

Accordingly, at compile time, S220 may preferably function to implement a compiler to optimize the instruction set containing the candidate inner loop to simultaneously maintain an operational performance of an integrated circuit executing the instruction set while minimizing a code size of the instruction set. That is, the loop optimization, as described in S220 may function to abstract from the loop body or eliminate a requirement for explicit backwards branching instruction within the loop body of a candidate inner loop. In this way, code optimizations, such as unrolling a code set for reducing operational penalties (e.g., stalls, wasted clock cycles, etc.) but correspondingly enlarging the code set, may not be required thereby minimizing the instruction set of a candidate inner loop and preserving memory used for storing the instruction set.

2.22 Antecedent Instructions for Loop Body Control|Defining the Multi-Part Implicit Branch Instructions for Loop Optimization In one or more embodiments, S220 includes S222, which includes setting and/or defining one or more parts of the multi-part implicit branch instruction within the instruction set containing a loop body of a candidate inner loop. In such embodiments, the multi-part implicit branch instructions (i.e., loop optimization) for optimizing the candidate inner loop includes at least two parts, which may be implemented as a modification of the instruction set by the compiler in any order, but for illustrative purposes a first part and a second part of the loop optimization are described.

In one or more embodiments, a first part of the loop optimization of a candidate inner loop may include augmenting the instruction set that includes the candidate inner loop with an antecedent instruction, which may sometimes be referred to herein as a "setup instruction". S222 may preferably add the first part of the loop optimization including the antecedent instructions in advance of and outside of the loop body of the candidate inner loop. That is, the antecedent instructions may be codified and/or arranged at a position within the target instruction set before the loop body instructions of the candidate inner loop. In this way, the antecedent/setup instruction(s) may be executed or seen by a processing entity before the instructions defining the loop body of the candidate inner loop.

In a preferred implementation, S222 may function to add the setup instructions immediately prior to the instructions defining a loop body of the candidate inner loop. That is, in such embodiment, the setup instructions may be added adjacent to an outside of or externally to the loop body of the candidate inner loop without intermediate instructions between the setup instructions and the loop body of the candidate inner loop.

In a variant implementation, non-loop body instructions may be arranged between setup instructions for a candidate inner loop and a loop body of the candidate inner loop. In such implementation, S222 may function to additionally specify the target of the setup instructions while accounting for the non-loop body instructions.

Additionally, or alternatively, S222 may function to define the setup instructions to include loop bounds (i.e., a start and end condition) of a candidate inner loop. That is, S222 may function to construct the additional setup instructions to include a start or an initiating condition that starts an execution of the loop body of the candidate inner loop together with a terminating or an ending condition that stops an execution of the loop body of the candidate inner loop.

While it may be preferably that the terminating condition of a candidate inner loop be a known value, in some embodiments, S222 may function to dynamically compute or dynamical derive a terminating condition for a given candidate inner loop and include the derived terminating condition as the terminal bound for stopping an execution of the loop body of the candidate inner loop.

Preferably, S222 may function to store the loop bounds in one or more registers. In one embodiment, S222 may function to store a start condition of a given loop bounds in a first register, as an immediate or the like (i.e., a value known at compile time that is encoded into a target instruction set) and a termination condition of the given loop bounds in a second register of second immediate. Additionally, or alternatively, S222 may function to define the setup instructions or antecedent instructions to include a branch target instruction or value identifying a relative location of the executable code for starting the candidate inner loop.

2.24 Suffixation of Reserved Loop Back Bit

In one or more embodiments, a second part of the multi-part implicit branch instructions for optimizing a candidate inner loop may include a suffixation of a single bit of instruction to a terminal instruction (i.e., last line instruction) of the loop body of the candidate inner loop an arrangement of the single bit of instruction within the loop body of the candidate inner loop. In some embodiments, the single bit of instruction may be referred to herein as a "suffixation bit," "reserved bit," "tailing bit," "sideband loopback bit" or simply a "loopback bit". Accordingly, in a preferred embodiment, S220 includes S224, which may function to identify a terminal or last instruction within a loop body of a candidate inner loop and affix a reserved bit to the terminal instruction or within the loop body of the candidate inner loop that causes an integrated circuit executing the reserved bit to revert to or loop back to the branch target specified in the setup instructions, as defined in S222. In one or more embodiments, the reserved bit may be added along a same line of code as the terminal instruction of the loop body of a candidate inner loop and distinctly affixed to the most terminal character of the terminal instruction of the loop body.

Additionally, or alternatively, an execution of the reserved bit and a consequent reversion to a branch target may function to increment or decrement a counter associated with the iterations of the subject inner loop, as discussed in more detail below.

While, in one or more embodiments, a reserved bit may be added to a tail end of a terminal instruction of a loop body of a candidate inner loop, the reserved bit may not function to supplant, subjugate, or otherwise, modify an effective operation due to an execution of the terminal instruction of the loop body having the reserved bit and may additionally, or alternatively, be added at any position or location within the loop body of the candidate inner loop. Rather, in one or more embodiments, the reserved bit may be added with a unique code structure recognized by a distinct processing entity (e.g., dispatcher 130, IMD (i.e., dispatcher), or the like) for processing and/or executing the reserved bit distinctly from the terminal instruction. That is, a first processing entity, such as a processing core (e.g., array core 110), may function to execute an entirety of the loop body including the terminal instruction while a second distinct processing entity (e.g., an IMD) may function to execute instructions of the reserved bit independently of the terminal instruction.

In one or more embodiments, a structure of the reserved bit may include a unique or distinct instruction from a structure of the terminal instruction in which a start of the reserved bit instruction may be designated with a special character, such as a dot or period. In such embodiments, the special character of the reserved bit may be followed with additional characters (e.g., ".lb" or the like) recognized by a processing entity as pointing to or reverting back to setup instructions for the loop body of the inner loop candidate. It shall be recognized that while any suitable special character may be used to designate or otherwise, indicate a start of the reserved bit instruction, in one or more embodiments, S224 may not use a special character or the like for designating the reserved bit.

2.30 Execution of Multi-Part Implicit Branch Instruction

At runtime, S230, which includes executing a multi-part implicit branch instruction for a given loop body, may function to identify and execute each part of the multi-part implicit branch instruction for a loop body of an inner loop. In a preferred embodiment, S230 may first function to execute the setup instructions component of the multi-part implicit branch instruction to make ready the operational constraints for looping back and terminating a looping back of a subject inner loop. Preferably, S230 may function to implement a distinct processing entity (e.g., an IMD) for executing the multi-part implicit branch instruction from a typical array processing core or from a processing entity that executes the loop body of the inner loop.

2.32 Execution of the Setup Instruction(s)

Figure 4A:
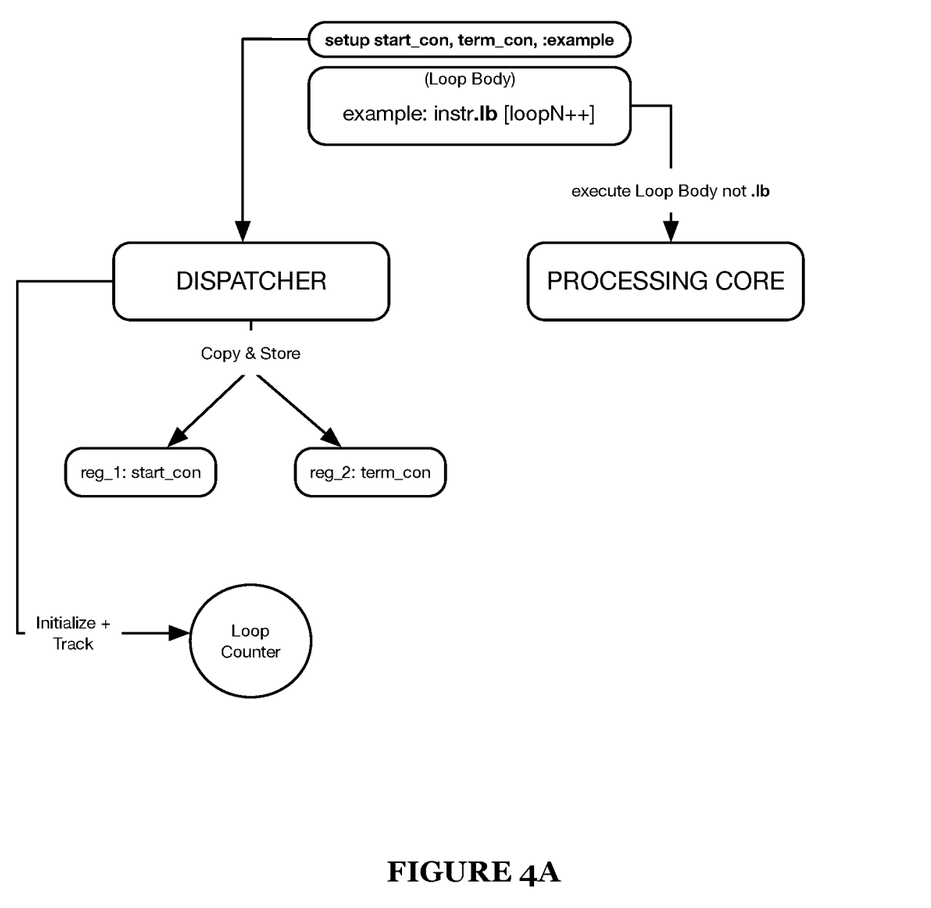
FIGS. 4A-4B illustrate schematics that example an execution of a loop optimized with implicit branch instructions in accordance with one or more embodiments of the present application.

In a preferred embodiment, executing the multi-part implicit branch instruction may include first executing a setup instruction or an antecedent instruction for a given loop body of an inner loop. In this preferred embodiment, S230 includes S232, may function to implement a distinct processing entity (e.g., a dispatcher, IMD, or the like) to store each component of the loop bounds of the loop body of the inner loop. That is, S232 may function to configure or setup branch target and copy and store each of the starting condition for the inner loop that starts an execution of the inner loop and the terminating condition that terminates an execution of the inner loop in one or more of registers and immediates (i.e., the branch target), as shown by way of example in FIG. 4A. Preferably, in the copying and storing, S232 may function to copy a location or otherwise notate the location of the first instruction of the loop body, per se, into a first distinct register or immediate and further, copy a location or an address of the code for the terminating condition into a second distinct register or immediate.

Additionally, or alternatively, in executing the multi-part implicit branch instruction, S232 may function to store a computed absolute target, i.e., program counter+relative target specified in the setup instructions.

2.34 Dedicated Loop Counter Initialization & Tracking

Additionally, or alternatively, S230 includes S234, may function to implement a dedicated loop counter that preferably tracks each iteration of a subject inner loop. In one or more embodiment, contemporaneous with an execution of setup instructions for a subject inner loop, S234 may function to clear and initialize a loop counter to a starting value. In such embodiments, the setup instructions preferably includes a location of one or more of the dedicated loop counter and a starting condition for the subject inner loop. In one or more embodiments, S234 may function to initialize the loop counter to a value associated with the starting condition (e.g., 0, 500, or the like). It shall be noted that the starting condition may be incremented or decremented and may be any suitable value.

S234 may additionally, or alternatively, use a distinct processing entity (e.g., an IMD) for tracking a state of the loop counter through each iteration of the subject inner loop. Thus, in parallel with an execution of a loop body of subject inner loop by a processing entity (e.g., a processing array core), S234 may function to separately track the state of the loop counter, such that, in one or more embodiments, when the dedicated loop counter achieves or satisfies a termination condition (e.g., a loop counter value), an execution of the loop body of the subject inner loop may be terminated.

2.40 Sideband Loopback Bit Execution

Figure 4B:
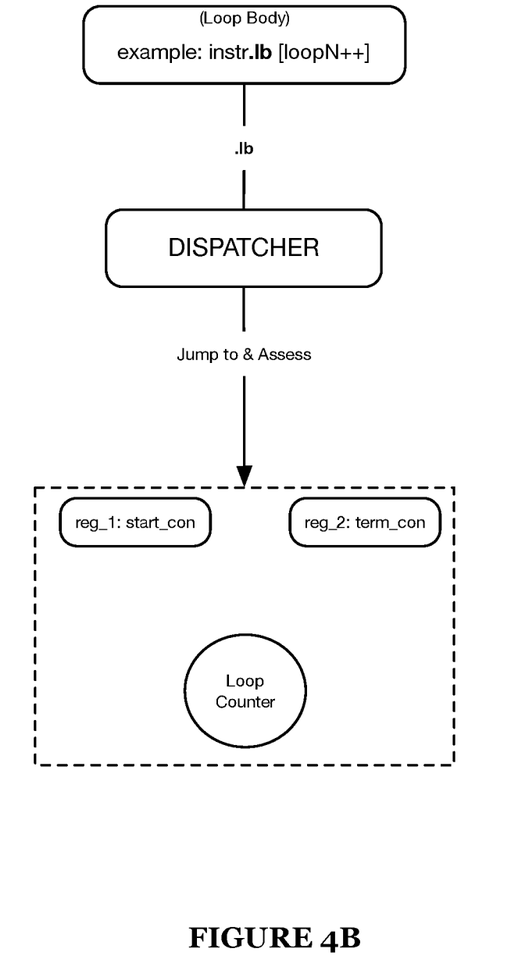

S240, which includes executing the reserved bit, may function to execute the reserved bit of a loop body of a subject inner loop and correspondingly, terminate an execution of the inner loop or execute another iteration of the subject inner loop. In particular, after execution of an iteration of a subject inner loop, S240, implemented by a distinct processing entity or the like, may function to read the reserved bit affixed to the most terminal instruction of a loop body of the subject inner loop, as shown by way of example in FIG. 4B. As mentioned above, S240 may function to implement a distinct processing entity, such as an IMD, to read and execute the reserved bit.

In a preferred embodiment, executing the reserved bit may cause the distinct processing entity to assess and/or change a value of a loop counter that tracks the iterations of the subject inner loop together with performing an evaluation of the termination condition against a value of the loop counter for fully terminating any further iterations, looping, or executions of the loop body of the subject inner loop.

Accordingly, in one or more embodiments, S240 implementing the distinct processing entity may function to first increment or decrement the loop counter to a new value. In some embodiments, the reserved bit may function to point the distinct processing entity to the setup instructions or setup branch target associated with the loop body of the subject inner loop, which may direct the distinct processing entity to a location or an address of the stored copy of the terminating condition for the subject inner loop and potentially, a storage location of a state of the dedicated loop counter for the subject inner loop. In one variant implementation, an execution of the reserved bit by the distinct processing entity may function to point the distinct processing entity directly to the location or the address of the stored copy of the terminating condition. Once the new value of the loop counter is established by incrementing or decrementing the loop counter, S240 may contemporaneously check or evaluate the new value of the loop counter against the terminating condition to determine whether the terminating condition is satisfied or not satisfied.

In the circumstance that S240 identifies that the terminating condition of the subject inner loop is not satisfied, S240 may function to cause a jump or execute a branch to an address or a location of the first instruction or starting instruction of the loop body of the subject inner loop and execute a new iteration of the subject inner loop. Alternatively, if S240 identifies that the terminating condition of the subject inner loop is satisfied, S240 may function to cause a termination of an execution of the subject inner loop and, in some embodiments, proceed with processing another instruction other than the loop body of the subject inner loop.

It shall be noted that while the process flow and/or one or more embodiments herein describe an optimization of inner loop instructions, as described in S210 and S220, being implemented together with an execution of the multi-part implicit branch instructions, in one or more embodiments, the optimization of the inner loop instructions and the execution of the multi-part implicit branch instruction may be implemented independently of each other. In particular, since it may be contemplated herein that the loop optimization may be performed at compile time and the execution of the multi-part implicit branch instruction may be performed at runtime, a distinct method for implemented each technique is contemplated by the various embodiments described herein.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method for improving a performance of an integrated circuit, the method comprising:
   implementing one or more computing devices executing a compiler program that:
   (i) evaluates a target instruction set intended for execution by an integrated circuit;
   (ii) identifies one or more nested loop instructions within the target instruction set based on the evaluation;
   (iii) evaluates whether a most inner loop body within the one or more nested loop instructions comprises a candidate inner loop body that requires a loop optimization that mitigates an operational penalty to the integrated circuit based on one or more executional properties of the most inner loop instruction, wherein if the most inner loop body within the loop body of the nested loop instructions includes an instruction for backwards branching, automatically setting the most inner loop body as the candidate inner loop for the loop optimization; and
   (iv) implements the loop optimization that modifies the target instruction set to include loop optimization instructions to control, at runtime, an execution and a termination of the most inner loop body thereby mitigating the operational penalty to the integrated circuit.

2. The method according to claim 1, wherein:
each iteration of the most inner loop body is executed by an array processing core of an integrated circuit array of the integrated circuit that includes a plurality of array processing cores; and
the loop optimization causes a distinct processing circuit external to the integrated circuit array to (a) control a start of the execution of each iteration by the array processing core and (b) control a termination of an execution of the most inner loop body by the array processing core.

3. The method according to claim 1, wherein
the evaluation further includes:
   (i) identifying a code size of the candidate inner loop,
   (ii) identifying whether the code size of the candidate inner loop satisfies or does not exceed an instruction size threshold, wherein the instruction size threshold relates to a maximum possible code size of a potential candidate for loop optimization, and wherein automatically setting the most inner loop body as the candidate inner loop for the loop optimization when the code size of the candidate inner loop satisfies or does not exceed the instruction size threshold.

4. The method according to claim 1, wherein
the evaluation further includes:
   (i) inspecting a structure of the candidate inner loop;
   (ii) identifying whether loop bounds of the candidate inner loop is discoverable based on the inspection; and
   (iii) if the loop bounds of the candidate inner loop are discoverable, deriving a starting condition and a deriving terminating condition of the candidate inner loop, wherein a combination of the starting condition and the terminating condition define the loop bounds of the candidate inner loop.

5. The method according to claim 1, wherein the loop optimization instructions comprise an implicit branch instruction that controls a looping operation of the candidate inner loop.

6. The method according to claim 5, wherein the implicit branch instruction comprises a multi-part branch instruction that is instructionally tethered to a loop body of the candidate inner loop for controlling a looping back operation of the candidate inner loop without a need for executing explicit backward branching instructions within the loop body of the candidate inner loop.

7. The method according to claim 6, wherein a first part of the multi-part branch instruction comprises an antecedent instruction that is codified at a position ahead of the loop body of the candidate inner loop.

8. The method according to claim 7, wherein the antecedent instruction identifies loop bounds of the candidate inner loop, wherein the loop bounds include a starting condition and a terminating condition of the candidate inner loop.

9. The method according to claim 8, wherein executing, at runtime, the antecedent instructions includes storing the loop bounds in a memory distinct from a memory storing the loop body of the candidate inner loop, clearing and initializing a dedicated loop counter for the candidate inner loop.

10. The method according to claim 8, wherein the antecedent instructions identifies a code location target that identifies a starting instruction of the loop body of the candidate inner loop.

11. The method according to claim 6, wherein a second part of the multi-part branch instruction comprises a suffixation bit that includes a single bit of instruction arranged within the loop body of the candidate inner loop.

12. The method according to claim 11, wherein the single bit of instruction identifies a terminal instruction of the loop body of the candidate inner loop that, when executed, causes a reversion to a code location target of the antecedent instructions that identifies a starting instruction of the loop body of the candidate inner loop.

13. The method according to claim 11, wherein an execution of the single bit of instruction causes an increment or a decrement to a dedicated loop counter for the candidate inner loop.

14. The method according to claim 5, wherein the implicit branch instruction comprises a multi-position branch instruction having (a) a first part comprising a first instruction that is positioned ahead of the loop body of the candidate inner loop and (b) a second part comprising one or more bits of instruction that are positioned at an end of a terminal instruction of the loop body of the candidate inner loop.

15. A system for improving a performance of an integrated circuit, the system comprising:
one or more computing devices executing a compiler program that:
(i) evaluates a target instruction set intended for execution by an integrated circuit;
(ii) identifies one or more nested loop instructions within the target instruction set based on the evaluation;
(iii) evaluates whether a most inner loop body within the one or more nested loop instructions comprises a candidate inner loop body that requires a loop optimization that mitigates an operational penalty to the integrated circuit based on one or more executional properties of the most inner loop instruction; and
(iv) implements the loop optimization that modifies the target instruction set to include loop optimization instructions to control, at runtime, an execution and a termination of the most inner loop body thereby mitigating the operational penalty to the integrated circuit,
wherein:
the loop optimization instructions comprise a multi-part implicit branch instruction that is instructionally tethered to a loop body of the candidate inner loop for controlling a looping back operation of the candidate inner loop, and
the multi-part implicit branch including:
(a) a first part that is codified at a position ahead of the loop body of the candidate inner loop and that causes a storing of loop bounds of the candidate inner loop, and
(b) a second part that includes a single bit of instruction codified within the loop body of the candidate inner loop that identifies a terminal instruction of the loop body of the candidate inner loop and that, when executed, causes a reversion to a storage location of the loop bounds.

16. A method for improving an operational performance of an integrated circuit, the method comprising:
controlling an execution of a looping operation of a target nested loop within a subject set of instructions, wherein the controlling includes:
(i) executing, by a distinct processing circuit, a first part of an implicit branch instruction for the target nested loop, wherein the executing the first part includes:
(i-a) storing loop bounds of the target nested loop in a memory distinct from a memory storing the loop body of the target nested loop,
(i-b) clearing and initializing a dedicated loop counter for the target nested loop, wherein the dedicated loop counter for the target nested loop is incremented or decremented according to each executed iteration of the target nested loop, and
(i-c) storing a code location target of a starting instruction of the loop body of the candidate inner loop in the memory storing the loop body of the target nested loop;
(ii) executing, by the distinct processing circuit, a second part of the implicit branch instruction, wherein the second part includes a single bit instruction positioned within the loop body, wherein the executing the second part includes:
(ii-a) causes a reversion to a storage location of the loop bounds, and
(ii-b) an increment or a decrement of the dedicated loop counter for the target nested loop;
wherein controlling the execution includes:
continuing the execution or terminating the execution of the loop body of the target nest loop by an array processing circuit of an integrated circuit array based on whether a value of the dedicated loop counter satisfies a terminating condition defined in the loop bounds.

* * * * *